United States Patent
Häsler et al.

(10) Patent No.: US 6,672,810 B2
(45) Date of Patent: Jan. 6, 2004

(54) FITTING FOR CONNECTING TWO STRUCTURAL COMPONENTS

(75) Inventors: Georg Häsler, Nagold (DE); Karl Kuppler, Nagold (DE); Reinhold Oettl, Nufringen (DE)

(73) Assignee: Häfele GmbH & Co., Nagold (DE)

( * ) Notice: Subject to any disclaimer, the term of this patent is extended or adjusted under 35 U.S.C. 154(b) by 0 days.

(21) Appl. No.: 10/139,617

(22) Filed: May 3, 2002

(65) Prior Publication Data

US 2002/0176740 A1 Nov. 28, 2002

(30) Foreign Application Priority Data

May 5, 2001 (DE) ................................ 201 07 661 U

(51) Int. Cl.[7] .............................................. F16B 13/06
(52) U.S. Cl. ........................... 411/44; 411/51; 411/55; 411/60.1
(58) Field of Search ............................. 411/32, 33, 44, 411/51, 60.1, 60.2, 62, 55

(56) References Cited

U.S. PATENT DOCUMENTS

| | | | |
|---|---|---|---|
| 2,903,938 A | * | 9/1959 | Strand .......................... 411/78 |
| 4,287,807 A | | 9/1981 | Pacharis et al. |
| 4,636,123 A | * | 1/1987 | Herb ...................... 411/60.1 X |
| 4,692,076 A | | 9/1987 | Herb |
| 5,536,122 A | * | 7/1996 | Weber .......................... 411/33 |
| 5,779,410 A | * | 7/1998 | Lautenschlager et al. ..... 411/33 |

FOREIGN PATENT DOCUMENTS

DE    3031048    3/1982

* cited by examiner

Primary Examiner—Neill Wilson
(74) Attorney, Agent, or Firm—Friedrich Kueffner

(57) ABSTRACT

A fitting for connecting two structural components, particularly plates, includes a clamping device mounted in the first structural component and an expanding sleeve which can be secured to the second structural component. A bolt is arranged in the expanding sleeve so as to be longitudinally movable by the clamping device for expanding the expanding sleeve using a conical portion of the bolt. The conical portion of the bolt is an approximately cone-shaped projection whose longitudinal axis is laterally offset relative to the longitudinal axis of the bolt.

8 Claims, 7 Drawing Sheets

A-A

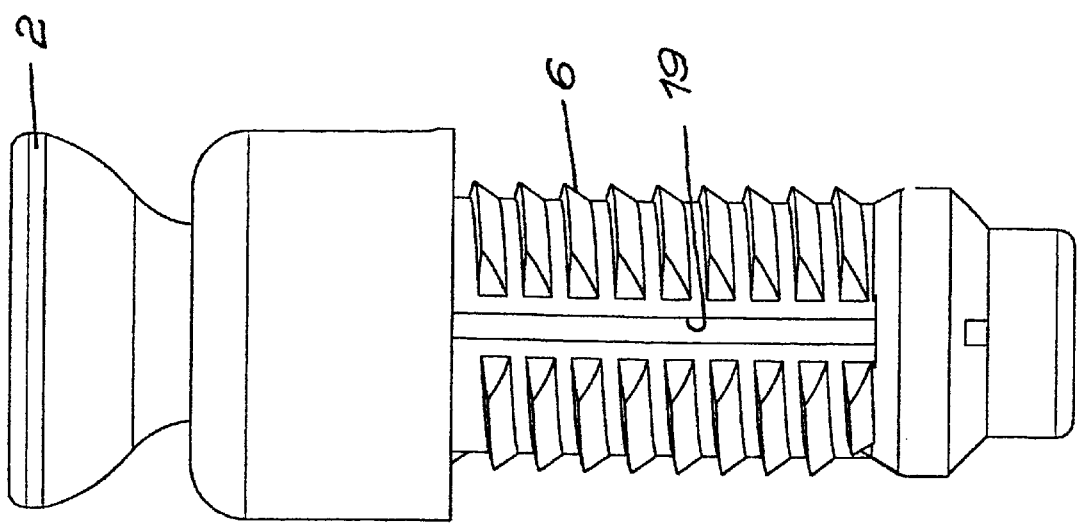

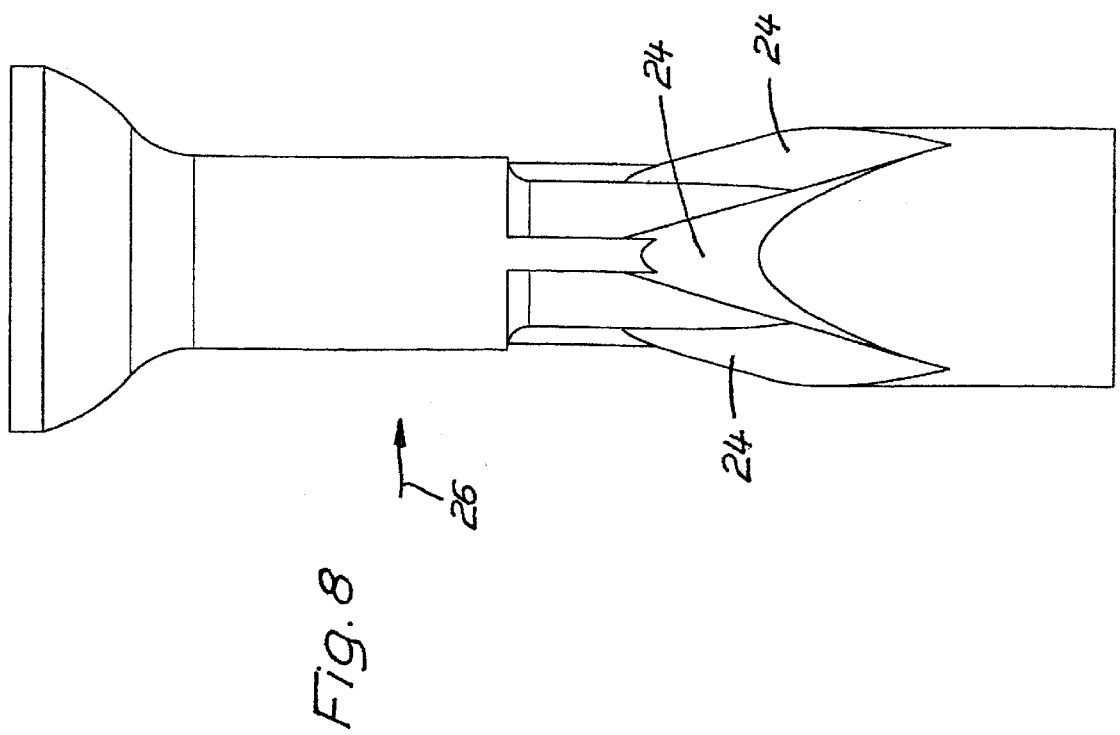

FITTING FOR CONNECTING TWO STRUCTURAL COMPONENTS

BACKGROUND OF THE INVENTION

1. Field of the Invention

The present invention relates to a fitting for connecting two structural components, particularly plates. The fitting includes a clamping device mounted in the first structural component and an expanding sleeve which can be secured in the second structural component. A bolt is arranged in the expanding sleeve so as to be longitudinally displaceable for expanding the expanding sleeve by means of the clamping device using a conical portion of the bolt.

2. Description of the Related Art

In known embodiments of the fitting of the above-described type, the conical portion is arranged centrically relative to the longitudinal axis of the bolt. When the bolt is displaced by means of the clamping device, the expanding sleeve is spread apart very unevenly and is pressed tightly against the inner walls of the bore only over a short portion, namely the area of the greatest expansion.

SUMMARY OF THE INVENTION

It is the primary object of the present invention to provide a bolt which expands the expanding sleeve over a longer portion and as evenly as possible.

In accordance with the present invention, the conical portion of the bolt is an approximately cone-shaped projection whose longitudinal axis is arranged laterally offset relative to the longitudinal axis of the bolt.

As a result of the configuration according to the present invention, the expanding sleeve is spread apart essentially uniformly over a relatively long longitudinal portion thereof, so that the expanding sleeve is securely anchored in the bore.

In accordance with a preferred embodiment, the longitudinal axes of the bolt and of the cone-shaped projection extend parallel to each other. The best solution has found to be an offset of the longitudinal axis of the cone-shaped projection at a distance from the longitudinal axis of the bolt which corresponds to the radius of the bolt.

In order to better be able to adapt the cone-shaped projection to the diameter of the sleeve, the projection is partially cut off at a side thereof, wherein the cut surfaces extend parallel to the longitudinal axis of the bolt. The cone-shaped projection may additionally have one or more laterally projecting webs whose surfaces serve to extend the surfaces of the cone-shaped projection.

For stabilizing and reinforcing the bolt, another feature of the present invention provides that the bolt shaft has one or more longitudinal ribs which extend parallel to the longitudinal axis of the bolt. Preferably, the expanding sleeve is injection molded around the bolt. In order to ensure that the expanding sleeve spreads better, an outwardly open slot is provided on the expanding sleeve. During injection molding, the slot is advantageously kept open by means of at least one rib which protrudes beyond the outer circumference of the cone-shaped projection and extends into the slot.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 7 is a view of the bolt, corresponding to FIGS. 3 to 6, shown with an injection-molded expanding sleeve around the bolt; and FIG. 8 is an illustration of another embodiment corresponding to FIG. 3.

DETAILED DESCRIPTION OF THE INVENTION

Figure 1:
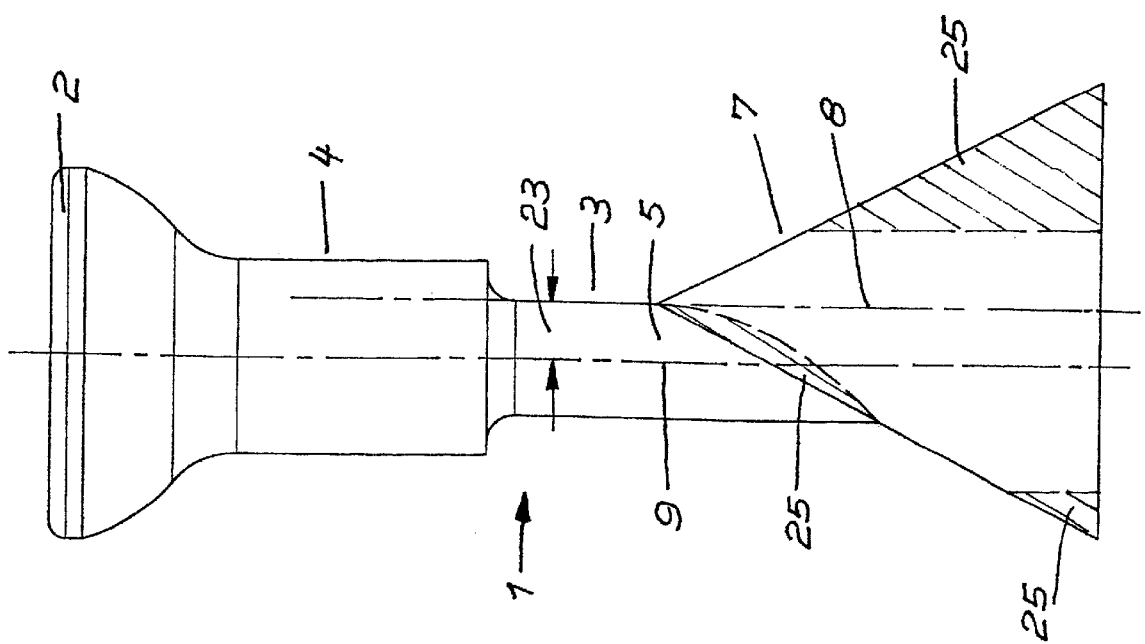
FIG. 1 is an elevational view of a bolt with a cone-shaped projection as the conical portion.

As illustrated in FIG. 1, a bolt 1 has a head 2 which, for connecting to structural components, not shown, engages in a clamping device, also not shown. Connected to the head 2 is a shaft 3, wherein the shaft portion 5 has a diameter which is offset relative to the diameter of the short shaft portion 4.

For expanding the expanding sleeve 6 shown in FIG. 7, the embodiment according to FIG. 1 provides that the conical portion is a cone-shaped projection 7 arranged at the end of the shaft portion 5. The longitudinal axis 8 of the cone-shaped projection 7 is arranged laterally offset relative to the longitudinal axis 9 of the bolt 1 by the radius 23 of the shaft portion 5 and, thus, extends so as to extend the outer circumferential line 10 of the shaft portion 5 parallel to the longitudinal axis of the bolt. When the bolt 1 is placed with the injection-molded sleeve 6 according to FIG. 7 into the recess of a structural component, not shown, and the bolt 1 is then tightened by means of the clamping device which is also not shown, the relative displacement between the bolt 1 and the expanding sleeve 6 causes the expanding sleeve 6 to expand along the cone-shaped projection 7. Since the cone-shaped projection 7 is laterally offset, a distribution of the expansion is achieved over the entire path of the bolt 1 relative to the sleeve 6, so that the expanding sleeve is securely fastened in the bore of the structural component, not shown. The hatched surfaces 25 in FIG. 1 show how the embodiment of FIG. 1 differs from the embodiment of FIG. 2.

Figure 2:
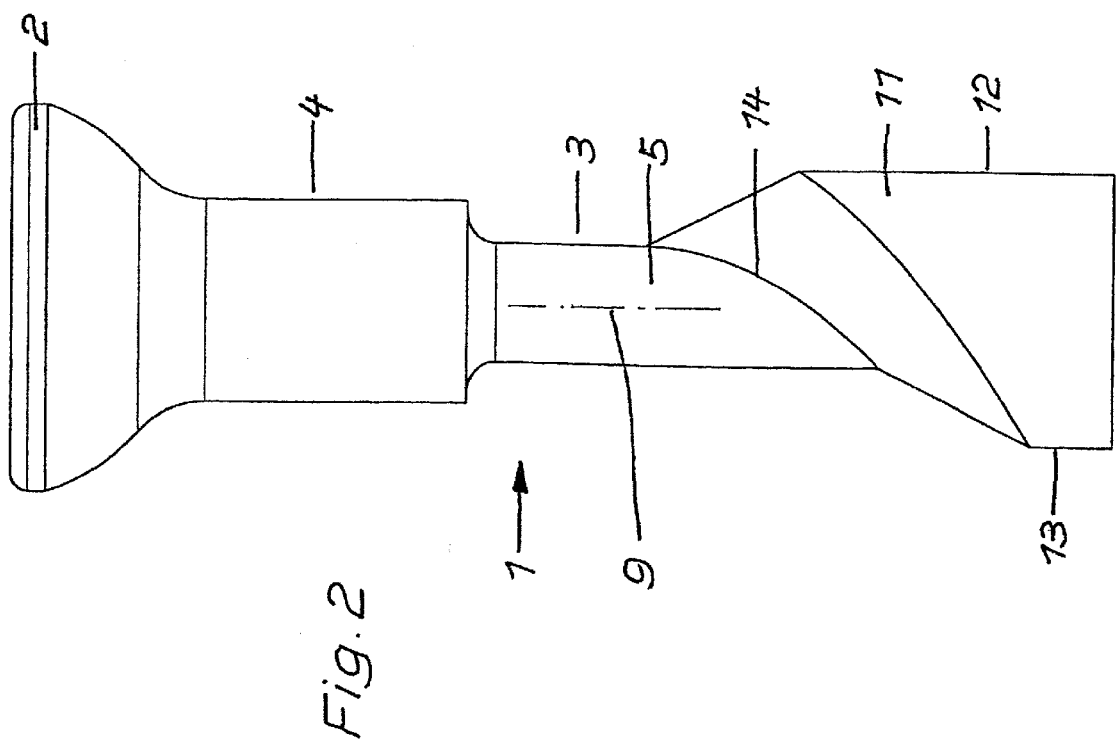
FIG. 2 is an illustration similar to FIG. 1, shown with a partially cut-off cone-shaped projection.

In accordance with FIG. 2, the cone-shaped projection 11 is cut off at the side in order to be able to better adapt it to the inner diameter of the sleeve 6, wherein the cut surfaces 12 and 13 extend parallel to the longitudinal axis 9 of the bolt 1. In addition, the cone-shaped projection 11 is adapted to the diameter of the shaft portion 5 at 14.

Figure 3:
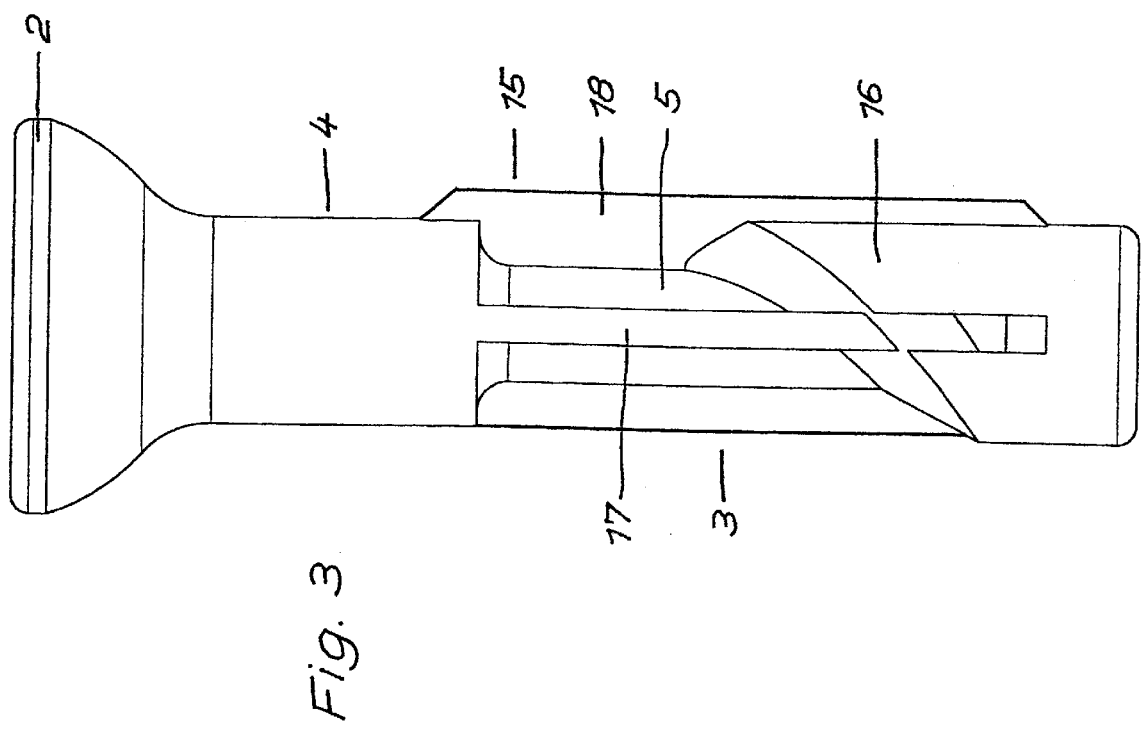
FIG. 3 is an illustration of another embodiment corresponding to FIG. 2.

In accordance with the embodiment of FIG. 3, the bolt 15 is provided between the shaft portion 4 and the laterally cut cone-shaped projection 16 at its shaft portion 5 with longitudinal ribs 17, 18 for stabilization, wherein the longitudinal ribs extend parallel to the longitudinal axis 9 of the bolt. The rib 18 projects beyond the outer circumference of the shaft portion 5 and also of the shaft portion 4 and extends into an outwardly open slot 19 of the sleeve 6. As a result, when the expanding sleeve is injection molded around the bolt 1, 15, the slot 19 remains open and the expanding sleeve can be spread apart more easily.

Figure 4:
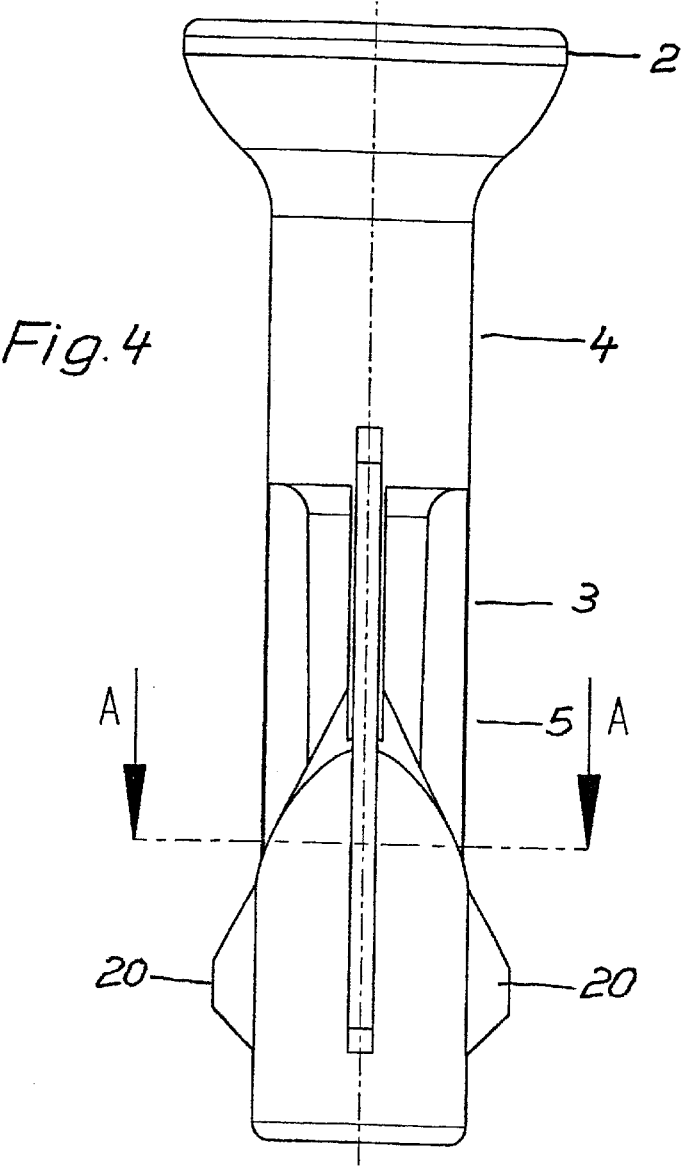
FIG. 4 is an illustration which is turned by 90° relative to FIG. 3.
Figure 5:
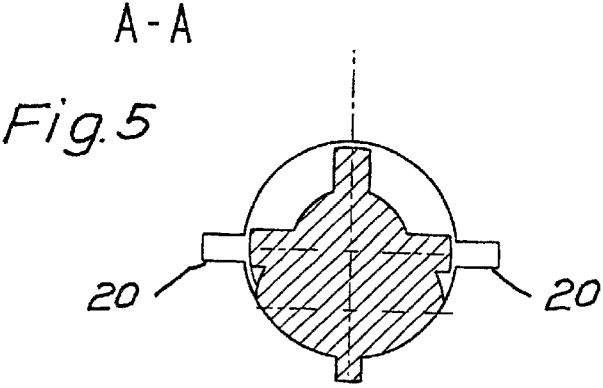
FIG. 5 is a sectional view taken along sectional line V—V of FIG. 4.
Figure 6:
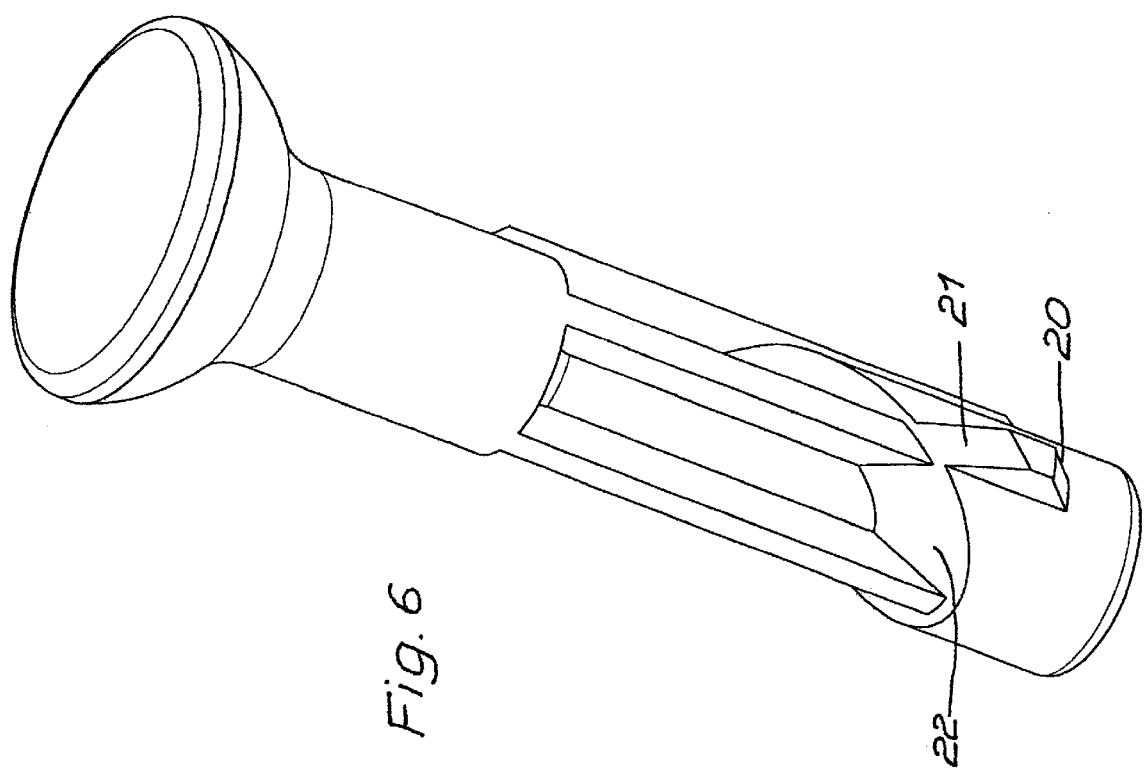
FIG. 6 is a perspective view of the bolt according to FIGS. 3 to 5.

FIGS. 4 to 6 show that two laterally projecting webs 20 are connected to the cone-shaped projection 16, wherein the surfaces 21 of the webs serve as an extension of the conical surface 22.

As shown in FIG. 8, several cone-shaped projections 24 are arranged next to each other along the circumference of the bolt 26 in order to increase the expanding effect.

While specific embodiments of the invention have been described in detail to illustrate the inventive principles, it will be understood that the invention may be embodied otherwise without departing from such principles.

We claim:

1. A fitting for connecting two structural components, particularly plates, the fitting comprising a clamping device adapted to be mounted in a first structural component and an expanding sleeve adapted to be secured in a second structural component, a bolt being mounted in the expanding sleeve so as to be longitudinally displaceable by the clamping device, the bolt having a longitudinal axis and a conical portion for expanding the expanding sleeve, wherein the conical portion of the bolt is comprised of an approximately cone-shaped projection having a longitudinal axis, wherein the bolt has a radius, and wherein the longitudinal axis of the cone-shaped projection extends at a distance from the longitudinal axis of the bolt which is equal to the radius of the bolt.

2. The fitting according to claim 1, wherein the longitudinal axis of the bolt and the longitudinal axis of the cone-shaped projection extend parallel to each other.

3. The fitting according to claim 1, wherein the cone-shaped projection has at least partially cut-off portions defining cut surfaces, wherein the cut surfaces extend parallel to the longitudinal axis of the bolt.

4. The fitting according to claim 1, wherein the cone-shaped projection has one or more laterally projecting webs having surfaces, wherein the surfaces of the webs extend in alignment with a conical surface of the cone-shaped projection.

5. The fitting according to claim 1, wherein the bolt has a head, further comprising at least one longitudinal rib extending on the bolt shaft between the head of the bolt and the cone-shaped projection and extending parallel to the longitudinal axis of the bolt.

6. The fitting according to claim 5, wherein at least one of the ribs extends beyond an outer circumference of the cone-shaped projection and into an outwardly open slot of the expanding sleeve.

7. The fitting according to claim 1, wherein the expanding sleeve is an injection molded component around the bolt.

8. The fitting according to claim 1, comprising a plurality of cone-shaped projections arranged next to one another on a circumference of the bolt.

* * * * *